US008140061B2

(12) United States Patent
Ricci

(10) Patent No.: US 8,140,061 B2
(45) Date of Patent: Mar. 20, 2012

(54) TELEPHONY SYSTEM

(76) Inventor: Christopher Ricci, Dayton, OH (US)

( * ) Notice: Subject to any disclaimer, the term of this patent is extended or adjusted under 35 U.S.C. 154(b) by 662 days.

(21) Appl. No.: 12/198,571

(22) Filed: Aug. 26, 2008

(65) Prior Publication Data

US 2010/0056142 A1  Mar. 4, 2010

(51) Int. Cl.
*H04M 3/42* (2006.01)
(52) U.S. Cl. ........... 455/417; 455/435.1; 455/418; 455/552.1; 455/456.4; 370/315; 370/328; 379/211.04
(58) Field of Classification Search .... 455/435.1–435.3, 455/433, 418, 456.4; 370/315, 328; 379/211.01–211.04
See application file for complete search history.

(56) References Cited

U.S. PATENT DOCUMENTS

| | | | | |
|---|---|---|---|---|
| 5,901,341 A * | 5/1999 | Moon et al. | ................ | 455/9 |
| 6,631,271 B1 * | 10/2003 | Logan | ................ | 455/456.1 |
| 6,718,026 B1 * | 4/2004 | Pershan et al. | ................ | 379/211.01 |
| 6,731,932 B1 * | 5/2004 | Rune et al. | ................ | 455/432.1 |
| 7,072,654 B2 * | 7/2006 | Fujiwara et al. | ................ | 455/435.1 |
| 7,693,512 B1 * | 4/2010 | West | ................ | 455/417 |
| 2003/0044654 A1 * | 3/2003 | Holt | ................ | 429/13 |
| 2006/0212179 A1 * | 9/2006 | Philips et al. | ................ | 701/1 |
| 2007/0129071 A1 * | 6/2007 | Shapira | ................ | 455/422.1 |
| 2008/0002820 A1 * | 1/2008 | Shtiegman et al. | ................ | 379/211.02 |
| 2008/0219377 A1 * | 9/2008 | Nisbet | ................ | 375/296 |
| 2008/0318561 A1 * | 12/2008 | Olshansky et al. | ................ | 455/417 |
| 2009/0215436 A1 * | 8/2009 | Howard et al. | ................ | 455/414.3 |
| 2010/0229229 A1 * | 9/2010 | Kumar et al. | ................ | 726/7 |
| 2010/0317285 A1 * | 12/2010 | Jang | ................ | 455/7 |

FOREIGN PATENT DOCUMENTS

EP    1178693   * 2/2002

* cited by examiner

*Primary Examiner* — Vladimir Magloire
(74) *Attorney, Agent, or Firm* — Sheridan Ross P.C.

(57) ABSTRACT

A telephony system includes a base station and a registration station in communication with the base station. The registration station further includes a base station transceiver for communicating with the base station using a first telecommunications standard, a handset transceiver for communicating with handsets in the vicinity of the registration station, and a registration program that automatically registers handsets in the vicinity of the registration station using a second wireless telecommunications standard.

50 Claims, 3 Drawing Sheets

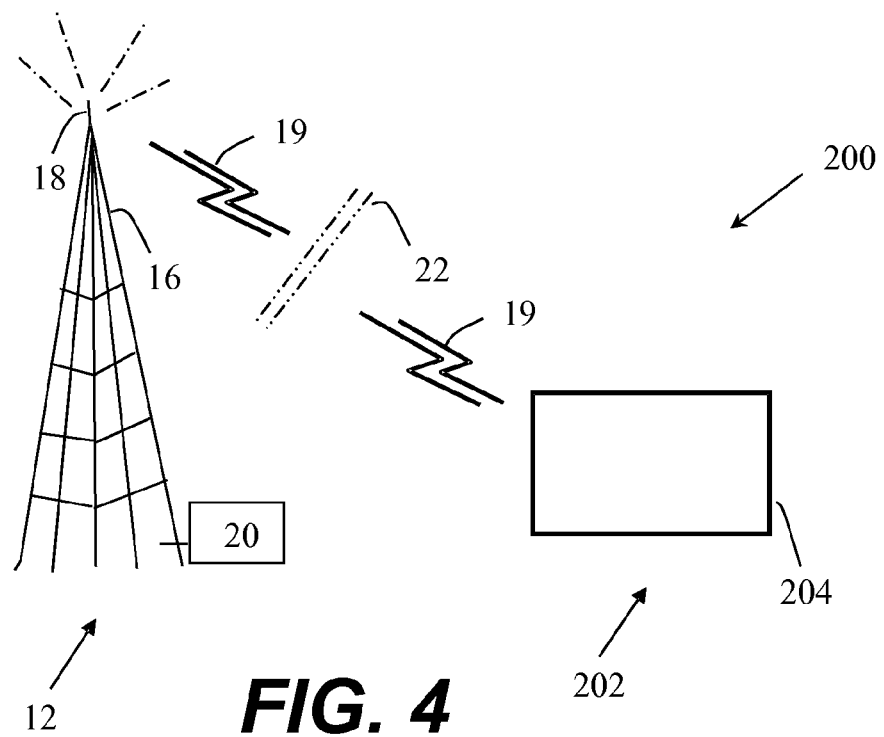
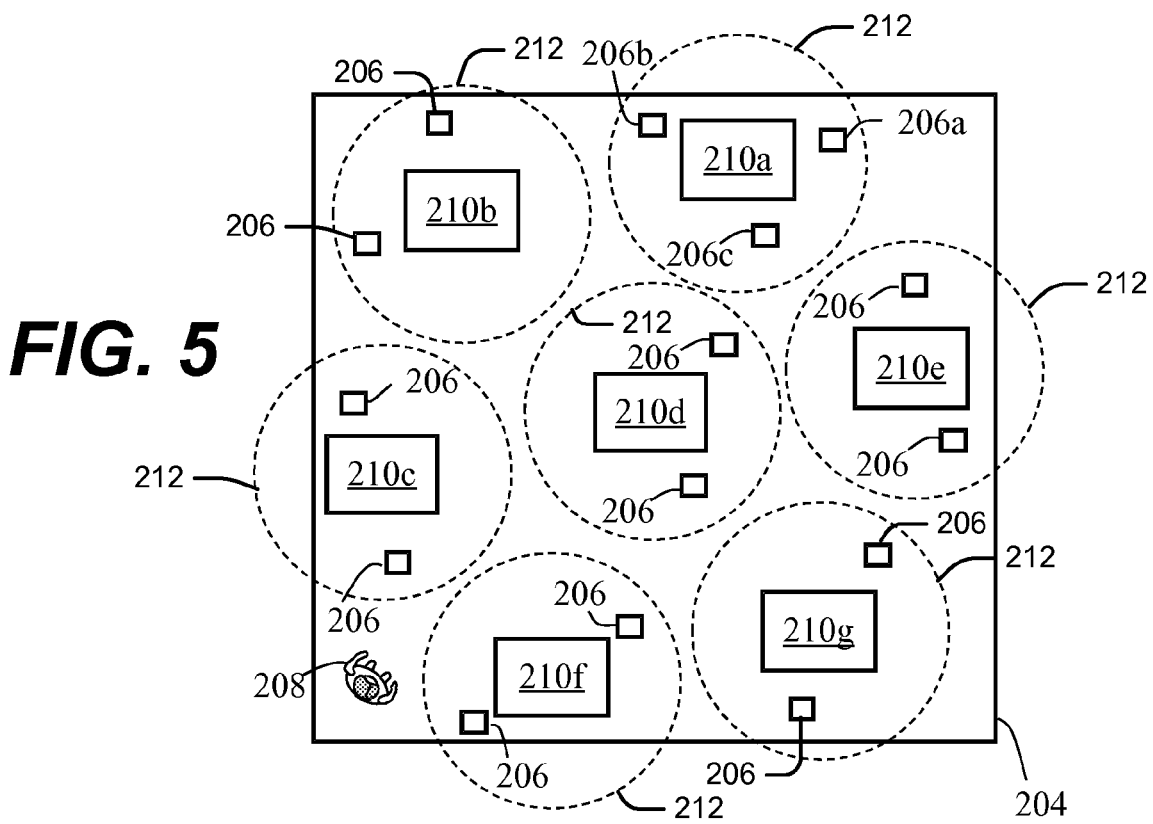

TELEPHONY SYSTEM

CROSS REFERENCE TO RELATED APPLICATION

The present application claims the benefits of U.S. Provisional Application Ser. No. 60/998,965, filed Oct. 15, 2007, entitled "Telephony System", which is incorporated herein by this reference in its entirety.

BACKGROUND

1. Field of the Invention

The present invention relates to improvements in or relating to telephony, such as broadband wireless access (BWA) telephony.

2. Discussion of the Prior Art

Telephones are now ubiquitous. The advent of cellular radiofrequency telephones ("cell phones") has caused a proliferation of telephones and has enabled users to be accessible by telephone wherever they go.

The proliferation of telephones has also had some disadvantages. Some users now have a cell phone for work and a personal cell phone, in addition to having one or more fixed line telephones at home, and a fixed line telephone in an office. This causes redundancy, which is inefficient.

Furthermore, the quality of telephony provided by cell phones is not always consistently high. There are still geographic areas having poor, limited, or no cell phone connectivity. Some international calls to or from cell phones also suffer from poor line quality, making effective communication difficult. Unsatisfactory connectivity and quality of service combine to make the elimination of a fixed telephone line and use of only mobile technology difficult at best.

Increasingly, cell phone users desire to be able to use their cell phones to answer all of their calls, whether these calls are business calls routed to their office, personal calls routed to their home, or personal calls routed to their cell phone. This allows continuous use of a single telephone whether at home, office or traveling. However, many people do not want to disclose their personal cell phone number to business contacts.

Routing calls from a land line to a cell phone has its own problems. Call forwarding requires multiple networks, giving rise to multiple fees and delays. If calls are not forwarded, then answering machines are typically used. Electro-mechanical answering machines typically wait a predetermined number of rings before answering. In addition, they are more prone to breaking down than network-based answering machines.

SUMMARY

In general, in one aspect, the invention features a telephony system including a base station and a registration station in communication with the base station. The registration station further includes a base station transceiver for communicating with the base station using a first telecommunications standard, a handset transceiver for communicating with handsets in the vicinity of the registration station, and a registration program that automatically registers handsets in the vicinity of the registration station using a second wireless telecommunications standard.

Implementations of the invention may include one or more of the following. The handset may be able to communicate with the base station directly when not in the vicinity of the registration station. The handset transceiver may be a cell phone so that a user can dial and receive calls using a cellular network or the telephony system. The telephony system may further include a plurality of additional base stations that may be interconnected with each other and the base station to cover a wide geographic area. The registration station may be connected to the base station by a fixed line connection. The registration station may be connected to the base station by a wireless connection. The first telecommunications standard may operate at a frequency higher than those frequencies used by cellular radiofrequency telephones. The first telecommunications standard may operate at a frequency higher than 3 GHz. The first telecommunications standard may operate at a frequency higher than 10 GHz. The first wireless telecommunications standard may be the IEEE 802.16 standard. The first wireless telecommunications standard may be the IEEE 802.20 standard. The first wireless telecommunications standard may provide high-bandwidth communication over relatively long distances. The second wireless telecommunications standard may be selected from the group consisting of BLUETOOTH®, 802.11b, 802.11g. The registration system may provide additional content selected from the group consisting of video, music, and messaging. The registration system may provide additional functions selected from the group consisting of conferencing, call forwarding, and call waiting.

In general, in another aspect, the invention features a telephony system including a base station transmitting and receiving signals according to a first wireless telecommunications standard and a registration station in communication with the base station. The registration station may further include a base station transceiver for communicating with the base station using the first wireless telecommunications standard, a handset transceiver for communicating with handsets in the vicinity of the registration station using a second wireless telecommunications standard, and a registration facility that automatically registers a handset as it enters the vicinity of the registration station, notifies the base station that the handset is present, and routes calls from the base station to the handset.

Implementations of the invention may include one or more of the following. The registration facility may forward a plurality of telephone numbers to the base station. The telephone numbers may be selected from the group consisting of a home telephone number, an office telephone number, and a cellular telephone number. The telephony system may further include a plurality of additional base stations wherein the plurality of additional base stations is interconnected with each other and with the base station to form a network covering a wide geographic area. The registration facility may automatically register a handset by receiving a unique hardware identification from the handset. The unique hardware identification may be a network address. The unique hardware identification may be a BLUETOOTH® identification code. Automatic registration may be facilitated using the discovery mode in BLUETOOTH®. The first wireless telecommunications standard may be the same as the second wireless telecommunications standard. The first wireless telecommunications standard may be different to the second wireless telecommunications standard. The registration facility may maintain a mapping of telephone numbers to a handset, so that each handset pre-registered with the registration station will receive calls directed to a plurality of telephone numbers. The plurality of telephone number may be selected from the group consisting of an office number, a home number, a personal cell phone number, and an office cell phone number. The registration facility may disable the mapping, although still storing the telephone numbers, when the handset is removed from the vicinity of the registration station. The mapping may be enabled when the handset re-enters the vicinity of the registration station. The registration facility may communicate with a call routing program in the base station to inform the base station that calls for any of the registered numbers are to be forwarded to the registration station when the handset is within the vicinity of the registration station. The registration facility may allow a user to send all calls directed to the plurality of telephone numbers to voicemail. The registration facility may allow the user to route calls directed to different numbers of the plurality of telephone numbers to different voicemail messages.

In general, in another aspect, the invention features a system including a network and a router coupled to the network. The router is configured to communicate with a cellular service provider to provide internet phone connectivity to a mobile phone when it is in a fixed location.

Implementations of the invention may include one or more of the following. The coupling between the network and the router may be selected from the group consisting of a hard wired connection and a wireless connection. The system may further include a wireless connection coupled to the router. The wireless connection may use the same frequency band as a cell phone. The wireless connection may be selected from the group consisting of BLUETOOTH® and WiFi. The wireless connection may have a range. The wireless connection may be capable of connecting to a cell phone within the range. The router may be configured to receive a broadcast of a hardware identification of the cell phone within the range. The router may be configured to access the cellular service provider and set the routing information for calls directed to the cell phone within the range to be routed to the router. The router may be configured to access the cellular service provider and reset the call routing information to normal cell phone connectivity through the cellular service provider when the cell phone within the range moves out of the range. The router may communicate with the cell phone within the range on the same frequency as a cellular service provider associated with the cell phone. The router may act as a mini cellular tower localized within a fixed location. The fixed location may be mobile. The mobile fixed location may be selected from a group consisting of an automobile, a train, an airplane, and a ship.

In general, in another aspect, the invention features a cellular telephone network including a broadband network and a router coupled to the broadband network. The router is capable of redirecting a telephone call directed to a cell phone to an IP address. The cellular telephone network further includes a device coupled to the broadband network. The device has the IP address. The device is capable of completing the redirected telephone call.

Implementations of the invention may include one or more of the following. The broadband network may be coupled to the Internet. The redirected telephone call may pass through the Internet. The device may be capable of delivering full Web content to the cell phone. The router may include a mapping facility that associates a virtual land line telephone number with a handset registered with the router. The handset may be associated with a pre-registered group. When a call directed to the virtual land line is received, the virtual land line and all handsets associated with the pre-registered group that are also within a range of the router may ring. The pre-registered group may be a family living in a home having a land line telephone number. The call may be forwarded to a network-based answering machine when none of the pre-registered group is within range of the router. The call may be forwarded to members of the pre-registered group in sequence in accordance with pre-defined rules when none of the pre-registered group is within range of the router. When a call directed to the handset is received, the virtual land line may ring and the handset may ring if it is within a range of the router. When the router receives a call directed to a cell phone that is not within a range of the router, the router may redirect the call to a voice mail. A virtual land line may be associated with a pre-registered group of cell phones. The router may redirect a call directed to the virtual land line if none of the pre-registered group of cell phones is within a range of the router.

In general, in another aspect, the invention features a method of providing high bandwidth telephony services in a local environment. The method includes communicating with a base station remote from the local environment using a first wireless telecommunications standard, detecting a handset entering the local environment, communicating with the handset using a second wireless telecommunications standard, automatically registering the detected handset, notifying the base station that the handset is present, and routing calls from the base station to the handset.

Implementations of the invention may include one or more of the following. The method may include detecting when the handset leaves the local environment, de-registering the handset, and notifying the base station that the handset is no longer present. Routing calls from the base station to the handset may include routing calls through a high bandwidth connection and a local router. The method may further include using the re-broadcast feature of the local router to increase the area that is accessible.

These and other aspects of the present invention will become apparent from the following specific description, given by way of example, with reference to the following drawings.

BRIEF DESCRIPTION OF THE DRAWINGS

The aspects of the present invention will become more apparent by describing in detail illustrative, non-limiting embodiments thereof with reference to the accompanying drawings, in which like reference numerals refer to like elements in the drawings.

FIG. 4 is a schematic diagram of a telephony system according to another embodiment of the present invention; and FIG. 5 is a schematic plan view showing a part (the facility) of the system of FIG. 4 in more detail.

DETAILED DESCRIPTION

Figure 1:
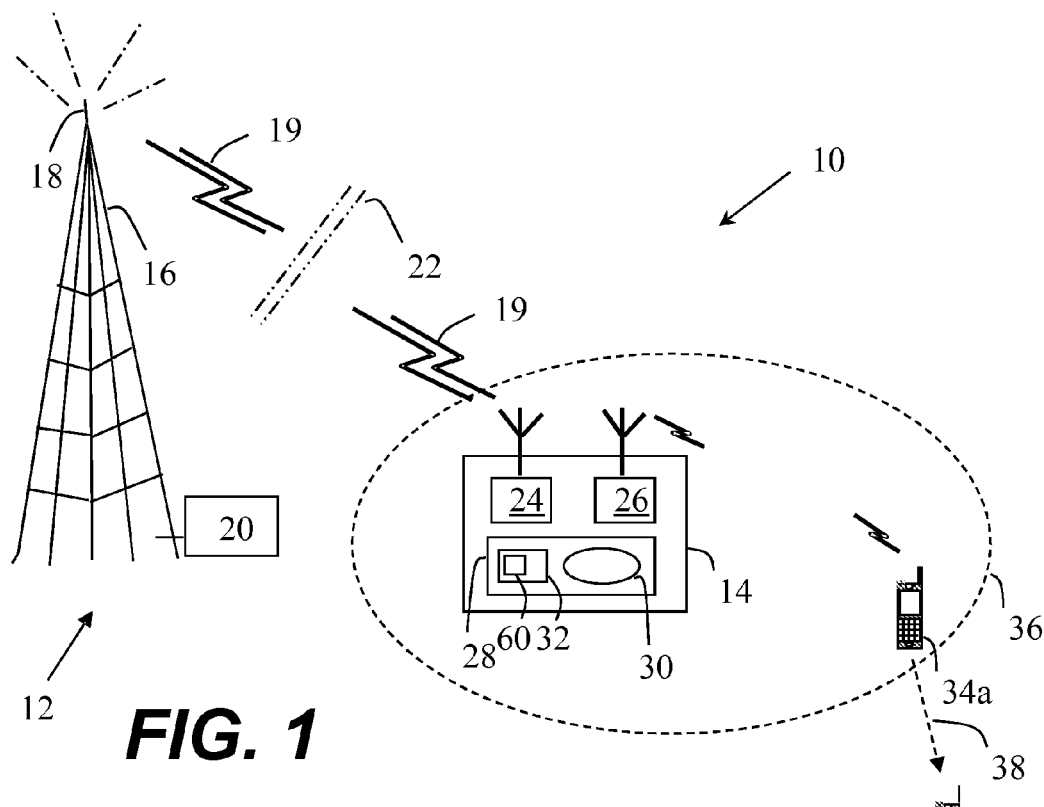
FIG. 1 is a schematic diagram of a telephony system according to one embodiment of the present invention.

Reference is now made to FIG. 1, which is a schematic diagram of a telephony system 10 according to one embodiment of the present invention.

In FIG. 1, the telephony system 10 comprises a base station 12 in wireless communication with a registration station 14 using a first telecommunication standard. The base station 12 comprises a mast 16 including an antenna 18 for transmitting signals over a relatively large area, illustrated in FIG. 1 by jagged lines 19. The antenna 18 is coupled to a base station controller 20. In this embodiment, the first telecommunication standard is the Worldwide Interoperability for Microwave Access (WiMAX) standard, also known as IEEE 802.16. This standard typically provides up to 50 km (31 miles) of linear service area range.

In this example, the base station 12 is located approximately five miles away from the registration station 14. In FIG. 1, most of the distance between the base station 12 and the registration station 14 is omitted, as illustrated in FIG. 1 by double broken lines 22. In one embodiment, the connection between the base station 12 and the registration station 14 is by way of fixed telephone lines. Such fixed telephone lines can include segments that are made of up wires, microwave transmissions, transmissions over fiber optic cables, transmission over undersea cables, and satellite communications.

In one embodiment, the base station 12 comprises a base station transceiver 24, a handset transceiver 26, and a controller 28 for controlling the transceivers 24, 26, and for executing a registration program 30. The controller 28 also includes non-volatile storage 32, such as Flash EPROM, for example.

In this embodiment, the base station transceiver 24 operates according to the WiMAX standard for communicating with the base station 12, and the handset transceiver 26 implements a second telecommunication standard to communicate with a handset 34 when the handset 34 is within range of the handset transceiver 26. In this embodiment, the second telecommunication standard is BLUETOOTH®, which has a typical range of approximately ten meters (10 m), illustrated by dotted line 36 in FIG. 1. One skilled in the art will recognize that the use of BLUETOOTH® is a design choice and that the second telecommunication standard may be a network protocol, such as IEEE 802.11x, a cellular protocol, such as GSM or CDMA, or even the same protocol as the first telecommunication standard.

In FIG. 1, the handset 34 is shown in two positions (as depicted by handsets 34a and 34b). In the first position, the handset 34 is within range 36 of the registration station 14; whereas, in the second position, the handset 34 is outside the range 36 of the registration station 14.

In one embodiment, the handset 34 includes a BLUETOOTH® transceiver (not shown) for communicating with the registration station 14. The handset 34 is operating in discovery mode, which means that when the handset 34 comes within range of the registration station 14, the registration program 30 will automatically establish contact with the handset 34. When requested by the registration program 30, the handset 34 (consistent with any other BLUETOOTH® device) will transmit the following sets of information on demand: Device Name; Device Class; List of services; Technical information, for example, device features, manufacturer, BLUETOOTH® specification, clock offset, and such like.

Figure 3:
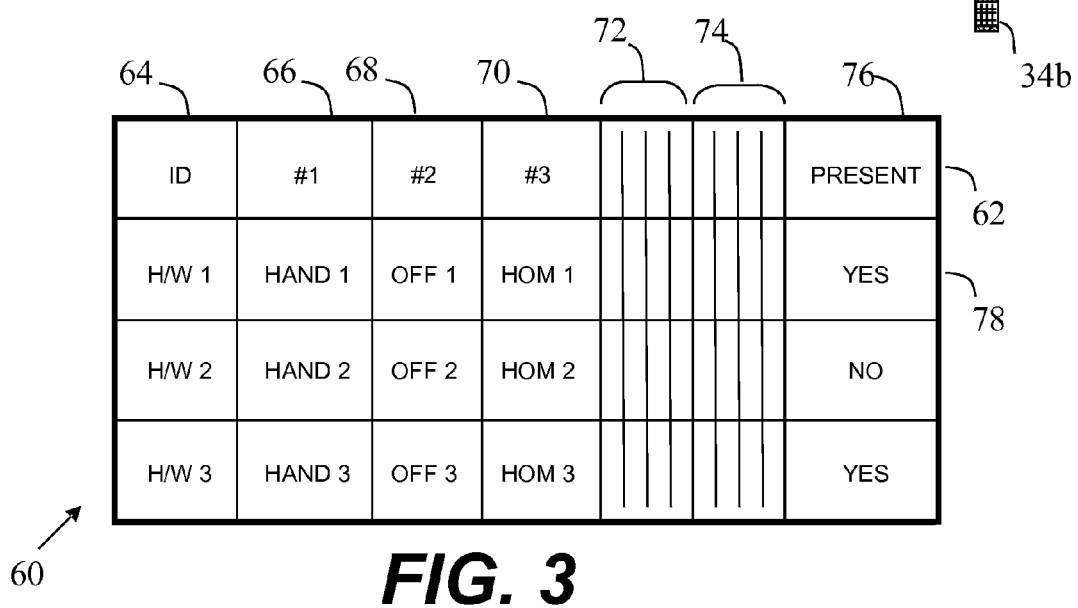
FIG. 3 is a diagram illustrating a mapping table stored in a part (the registration station) of FIG. 1.
Figure 2:
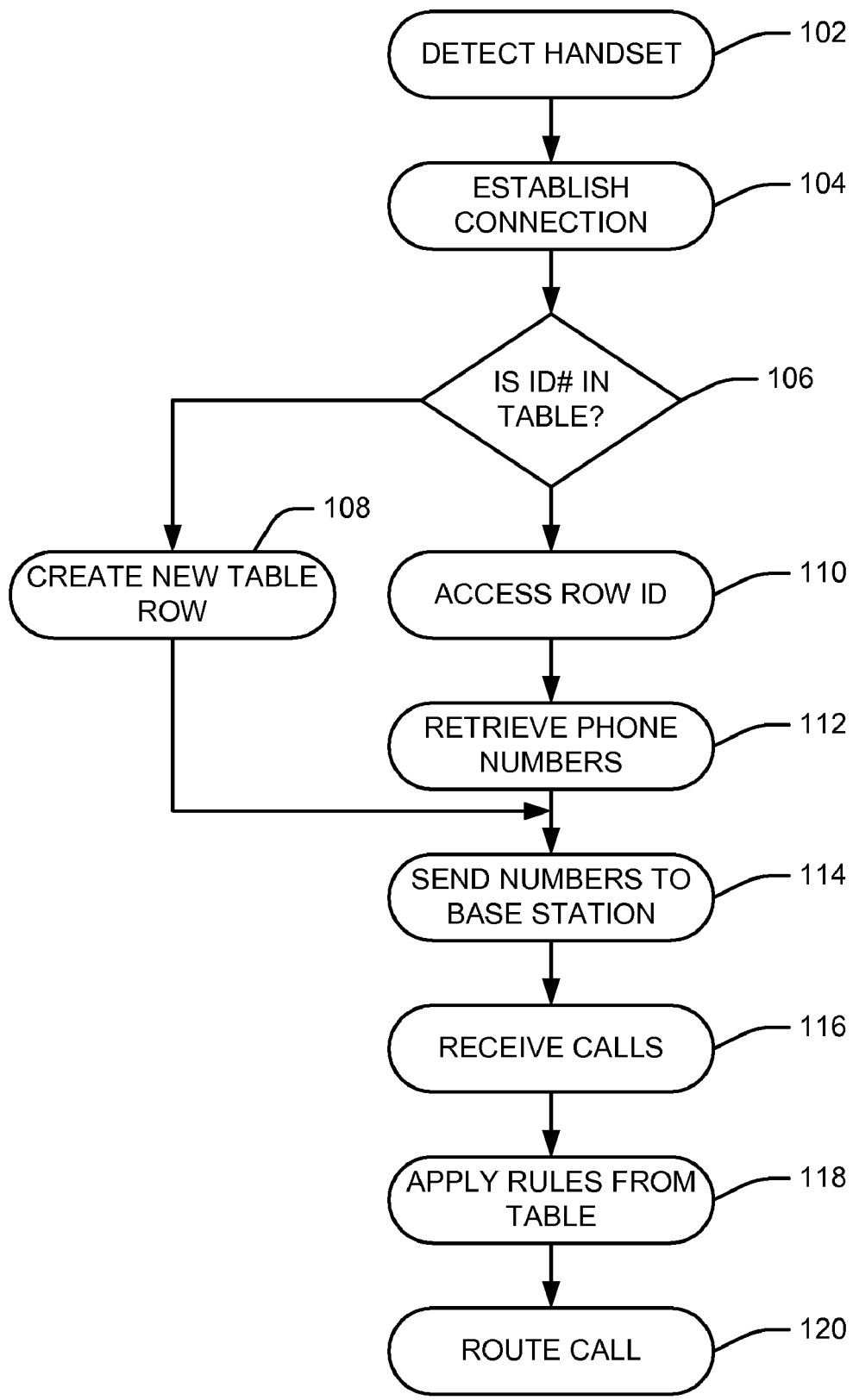
FIG. 2 is a flowchart illustrating the steps involved in registering a handset with the telephony system of FIG. 1.

Reference is now made to FIG. 2, which is a flowchart illustrating one embodiment of registering a handset 34 with the telephony system 10 of FIG. 1, and also to FIG. 3, which illustrates one embodiment of a mapping table stored in the EPROM 32.

Initially, a user will ensure that his/her handset 34 is in discovery mode.

A user can move around the region covered by the base station 12 and receive or place telephone calls using the handset 34, which communicates directly with the base station 12.

In one embodiment, when the user enters the vicinity of the registration station 14, the registration program 30 automatically detects the presence of the handset 34 (block 102) via the handset transceiver 26. In one embodiment, this is simplified by the discovery mode when the BLUETOOTH® protocol is used. In one embodiment, the registration program 30 establishes communication with the detected handset 34 (block 104) and retrieves any required information. In one embodiment, when communicating with the handset 34, the registration program 30 receives a unique hardware identification from the handset 34, which the registration program 30 will use to access a mapping table 60 (FIG. 3) stored in the FLASH EPROM 32.

The mapping table 60 stores information provided by the owners or users of handsets, as shown in FIG. 3. For simplicity, FIG. 3 only shows four rows and a limited number of columns; however, in practice mapping tables would typically be very much larger.

In one embodiment, shown in FIG. 3, the mapping table 60 stores a plurality of telephone numbers for each unique hardware identification. Header row 62 in mapping table 60 shows an identification column 64 for the unique hardware identification of a handset, a column 66 for the handset telephone number, a column 68 for an office telephone number used by the owner or carrier of the handset 34, a column 70 for a home telephone number used by the owner or carrier of the handset 34, additional number columns (shown generally by numeral 72) for additional telephone numbers, and multiple columns indicating preferences (shown generally by numeral 74), such as call forward to a different number if unanswered, call forward to an answering machine if unanswered, and such like. Column 76 is a present column that indicates if a handset is actually present within range of the registration station 14.

In one embodiment, a unique hardware identification can be associated with more than one row, which allows more information to be stored for each unique hardware identification. In one embodiment, the mapping table is limited to a single row for each unique hardware identification.

Row 78 illustrates an entry for a particular handset user. As can be seen by the use of the word "PRESENT" in the present column, the handset is within range of the registration station 14.

In one embodiment, the mapping table entry for a particular handset can be updated at any time by the user of that handset. In one embodiment, the mapping table 60 permanently stores telephone and other information for users who have pre-registered their handsets with the registration station 14. In one embodiment the mapping table 60 "expires" telephone and other information for pre-registered handsets which have not been within range of the registration station for a predetermined period of time, such as 1 year, for example.

In one embodiment, using the unique hardware identification for the handset 34 as a key, the registration program 30 ascertains whether the handset identification for the handset 34 is listed in the mapping table (block 106).

In one embodiment, if the handset 34 is not listed, then the registration program 30 creates an entry (a new row) based on the unique hardware identification and adds to that new row the handset telephone number obtained from the handset by the registration program 30 (block 108). In one embodiment, the registration program 30 also sets the present column 76 in the newly-created row to indicate that the handset 34 is present within the vicinity of the registration station 14.

In one embodiment, if the handset 34 is listed, then the registration program 30 accesses the appropriate row of the mapping table 60 (block 110) and extracts the telephone information therefrom (block 112). In one embodiment, the registration program 30 also sets the present column 76 for that row to indicate that the handset 34 is present within the vicinity of the registration station 14.

In one embodiment, the registration program 30 then forwards the handset telephone number, together with any other telephone numbers listed in the appropriate entry of the mapping table 60, to the base station 12 (block 114) via the base station transceiver 24. This informs the base station 12 that all telephone calls for those forwarded numbers are to be routed to the registration station 14.

In one embodiment, the base station 12 then updates its own routing table (not shown) to route all calls for the forwarded telephone numbers to the registration station 12. In one embodiment, the routing table (not shown) associated with the base station 12 is for all of the handsets within range of the base station 12. In one embodiment, the worldwide telephone system includes many other base stations (not shown) and the base station 12 communicates the telephone numbers to the other base stations so that those base stations can update their routing tables. In one embodiment, the communication between base stations is done in a cascading fashion, with base stations communicating the telephone numbers from one to another in ever-expanding groups until all base stations have been notified. In one embodiment, it is necessary to update only a subset of base stations. For example, only the base stations in a particular country or region need be updated. Alternatively, only the base stations that already have forwarding information associated with the telephone numbers are updated. In one embodiment, the base station 12 routing table is for the entire worldwide telephone system so that updating its routing table accomplishes the forwarding function for all of the telephone numbers.

When a call is placed to one of the forwarded telephone numbers (for example, the office telephone number of the handset user), then the base station 12 forwards the call to the registration station 14 via the antenna 18. The registration program 30 receives this call via the base station transceiver 24 (block 116) and ascertains from the corresponding mapping table entry 78 what rules to apply to the incoming call (step 118), as provided in the preferences columns 74. For example, the handset user may have chosen to route all office telephone calls to voicemail between certain hours.

The registration program 30 then routes the call according to the rules extracted from the preferences columns 74 (step 120). In this example, a call to the handset telephone number is routed via the base station 12 and the registration station 14 to the handset 34.

When the handset 34 moves from the first position 34a within the vicinity of the registration station 14 (as shown by dotted line 36) to the second position 34b outside the vicinity of the registration station 14 (as illustrated by dotted arrow 38), then the registration program 30 notices that the handset 34 is no longer communicating with it, and updates the present column 76 of the mapping table 60 to indicate that the handset 34 is no longer present.

The registration program 30 then notifies the base station 12 via the base station transceiver 24 that all telephone calls for the telephones numbers previously transmitted (relating to the handset 34) are no longer to be routed to the registration station 14. In response to this notification, the base station 12 updates its own routing table (not shown) to stop routing all calls for the forwarded telephone numbers to the registration station 12.

The user will then receive calls directed to the handset telephone number directly from the base station 12.

It will be appreciated that while the handset 34 is in the vicinity of the registration station 14, the handset 14 can receive additional content (music, video, and such like) directly from the registration station 14.

Another embodiment of the present invention will now be described with reference to FIG. 4. In this embodiment, a telephony system is provided that automatically routes calls to the nearest fixed telephone line to a user. In FIG. 4, an enterprise telephony system 200 comprises a base station 12 in wireless communication with an enterprise network 202 of advanced registration stations 214. The base station 12 is similar to that of FIG. 1, and like reference numerals in FIG. 4 correspond to the description provided for FIG. 1.

The enterprise network 202 is provided within a facility 204 (which may comprise one or more buildings operated by an entity or association).

Reference will now be made to FIG. 5, which is a schematic plan view showing the facility 204 in more detail. The facility 204 provides a plurality of workstations 206 at which a user 208 may work. The user 208 is free to select any workstation 206—the facility provides what is sometimes referred to as "hot-desking", or "hoteling".

Within the facility 204 are a plurality of advanced registration stations 210 (seven of which are shown in FIG. 5 labeled 210a . . . g). Each advanced registration station 210 has a limited range (illustrated by broken circles 212) and is able to route calls for a handset to a fixed telephone line within the vicinity of that advanced registration station 210. The user 208 moves around within the facility 204 to a workstation 206a either chosen by or pre-assigned to the user 208.

As the user 208 moves within range of a registration station 210, that registration station 210 detects the presence of the user's handset (not shown) and establishes communication with that handset in a similar way to that described with reference to the embodiment of FIG. 1, which includes updating the mapping table for that registration station 210. When the user 208 leaves the vicinity of the registration station 210, then the mapping table is updated to reflect that the user 208 is no longer present. For example, as the user 208 moves from the lower left corner of FIG. 5 towards workstation 206a, then the user 208 may enter the range of registration stations 210c, then 210d, and finally 210a.

When the user 208 is located at workstation 206a then the registration station 210a detects that the user's handset (not shown) is present within range 212 of the registration station 210a. The registration station 210a is pre-programmed (in the mapping table) with fixed line telephone numbers of workstations within its range (in FIG. 5, these are workstations 206a, b, and c).

If the registration station is equipped with a mechanism to ascertain the approximate location of the handset (for example, using a GPS system or using signal triangulation) then the registration station 210a will update the mapping table (not shown) to include the fixed line telephone number at the workstation 210a being used by the user 208.

As with the embodiment described with reference to FIG. 1, the registration station 210a will then update the base station 12 so that any calls for the handset are routed to the registration station 210a, then routed to the fixed telephone line at workstation 206a. If the user moves to another workstation 206 outside the range of the registration station 210a, then the mapping table of the registration station 210a will be automatically updated to indicate that the handset is no longer present. This embodiment has the advantage that a user can automatically move through a facility, and be assigned a fixed telephone number automatically by the nearest registration station 210 based on the identification of the handset carried by the user 208.

As the enterprise network 202 always knows where every user is located, the network 202 can track a user or provide information to an administrator about the location of a user.

In the embodiment of FIG. 4, the system may include default fixed telephone lines for users. This may be particularly appropriate where a user has a permanent workstation in an office, or where the facility is the user's home. If the registration station associated with the user's default fixed telephone line does not detect the presence of the user's handset, then the registration station may not direct any telephone calls to the fixed telephone line, but rather direct an incoming call according to the rules provided in the mapping table for that registration station, which may be to the user's handset or to some other telephone.

In one embodiment, the arrangement illustrated in FIGS. 4 and 5 is applied in an area in which more than one handset could receive telephone calls, such as, for example, cell phones held by family members in a home. In one embodiment, the registration station 210 would be a virtual land line telephone; that is, the registration station is not actually a telephone. The cell phones of individual family members would register with the registration station 210 and form a pre-registered group. When there are multiple registered handsets within range of the registration station 210 (for example, where multiple family members are all within the vicinity of the registration station 210), a call on the virtual land line telephone number will cause all of the registered handsets within range to ring, thus emulating a true land line. In one embodiment, the registration station 210 forwards "caller ID" information indicating that the telephone call is coming in on the virtual telephone number. However, in one embodiment, if a call comes in through the registration station that is directed to an individual cell phone, then it is only addressed to the appropriate handset. In effect, the handsets become personal extension phones to the virtual land line.

In this embodiment, there is no land line for an answering machine to support. In one embodiment, when a call comes in to the virtual telephone number associated with a registration station and none of the pre-registered group is within range of the registration station, the call is immediately transferred to a conventional network-based answering machine. Alternatively, in another embodiment, the call is forwarded to a cell phone, or to a set of cell phones in sequence, in accordance with predefined rules. Thus, continuing the example of the family, if a call is directed to a registration station at a home and no one is home, the call would be redirected to one or more of the family's cell phones.

This same technique could be used in other environments in which a number of handsets might be associated with a single virtual telephone number. A real estate sales office, for example, might have a virtual telephone number that would cause any phones held by a pre-registered group of agents within range of a registration station to ring. Calls to individual phones would cause only the individual phone to ring. Calls to the virtual telephone number when none of the pre-registered group is within range of the registration station (i.e., in the office) would be routed to an answering machine (network-based or otherwise) or would be forwarded to agent's cell phones, perhaps in reverse order of seniority.

Various modifications may be made to the above described embodiments within the scope of the present invention. For example, in other embodiments the first telecommunication standard may be the standard known as IEEE 802.20. In other embodiments, the first telecommunication standard may be a standard used in cellular telephony (CDMA, GSM, or such like). In other embodiments, the second telecommunication standard may be 802.11b, 802.11g, or any other convenient standard.

In embodiments where BLUETOOTH® is used as the second communications standard, handsets may be permanently set to BLUETOOTH® discovery mode. Alternatively, a user can opt out of automatic registration with the registration station 14 by de-selecting discovery mode on the handset, thereby ensuring that all calls are routed from the base station 12 directly to the handset 34.

In other embodiments, the registration station 14 may be physically connected to a wide area network (such as the Internet) so that the first telecommunication standard is based on an Ethernet connection and/or Internet technologies. Alternatively, the registration station 14 may be coupled to a wide area network in addition to being coupled to the base station 12 by the first telecommunication standard.

In other embodiments, the mapping table may store different information than that described above, including more or fewer telephone numbers, and such like. The structure of the mapping table may be different to that described above.

In other embodiments, the mapping table 60 may be downloaded from the base station 12, or may store minimal information about each handset.

In other embodiments, the registration station 14 may be located in a vehicle, such as a car, an airplane, a ship, or a train. When the user enters the vehicle, the user's handset is automatically registered by the registration station 14 in the manner described above with reference to FIGS. 1 to 3. This provides a booster for the handsets to improve the signal quality.

In other embodiments, the facility 204 may comprise multiple buildings spread over a large geographic area.

In other embodiments, the handset 26 is used as a multimedia alarm in a closed environment. That is, in situations requiring prescribed action; all handset users are notified of a coded situation requiring action. Instruction sets for each handset holder could be customized to provide instruction in both audio and video. An example of the foregoing would be that when a computer server goes down, the communication system notifies the predetermined list of people charged with handling the situation. However, in contrast to a general alarm, the handsets of those on the list that are within the premises are registered with a router which is in communication with registration stations 14 or 210, therefore, the system can intelligently determine who to notify.

In still other embodiments, the handset may use IP TV to allow the handset to act as a television receiver. In this embodiment, the handset may be a cell phone, a portable television or may be a set top box dedicated to a television for providing TV signals thereon. In the same manner, an addition of a digital camera to the phone allows for bi-directional video and audio communication.

Having described methods, apparatuses and articles of manufacture for extracting value from a large portfolio of assets, it is believed that other modifications, variations and changes will be suggested to those skilled in the art in view of the teachings set forth herein. It is therefore to be understood that all such variations, modifications and changes are believed to fall within the scope of the present invention. Although specific terms are employed herein, they are used in their ordinary and accustomed manner only, unless expressly defined differently herein, and not for purposes of limitation.

What is claimed is:

1. A system comprising:
a registration station in communication with a cellular base station, the registration station further comprising:
a base station transceiver operable to communicate with the base station using a first telecommunications standard;
a handset transceiver operable to communicate with handsets in communication range of the registration station; and
a controller operable to register automatically handsets in communication range of the registration station using a different second wireless telecommunications standard, wherein, through registration, the controller receives a unique hardware identification from each registered handset and wherein:
the controller uses a selected unique hardware identification to determine a set of user preferences for the respective registered handset, the user preferences comprising forwarding an incoming call to a different telephone number if unanswered, forwarding an incoming call to an answering machine if unanswered, and forwarding an incoming call to an answering machine when received between certain hours; and the controller forms a pre-registered group when there are multiple registered handsets having different telephone numbers within range of the registration station, whereby an incoming call to a given telephone number is directed to all of the handsets in the pre-registered group.

2. The telephony system of claim 1, wherein the user preferences comprise forwarding an incoming call to a different telephone number if unanswered.

3. The telephony system of claim 1, wherein the user preferences comprise forwarding an incoming call to an answering machine if unanswered.

4. The telephony system of claim 1, wherein the user preferences comprise forwarding an incoming call to an answering machine when received between certain hours.

5. The telephony system of claim 1, wherein a plurality of additional base stations are interconnected with each other and the base station to cover a wide geographic area, wherein the handset is able to communicate with the base station directly when not in communication range of the registration station, and wherein the handset transceiver is a cell phone so that a user can dial and receive calls using a cellular network or the telephony system.

6. The telephony system of claim 1, wherein the registration station is connected to the base station by a fixed line connection and wherein the first telecommunications standard operates at a frequency higher than those frequencies used by cellular radiofrequency telephones.

7. The telephony system of claim 1, wherein the registration station is connected to the base station by a wireless connection and wherein the first telecommunications standard operates at a frequency higher than those frequencies used by cellular radio frequency telephones.

8. The telephony system of claim 1, wherein the first telecommunications standard operates at a frequency higher than 3 GHz.

9. The telephony system of claim 1, wherein the first telecommunications standard operates at a frequency higher than 10 GHz.

10. The telephony system of claim 1, wherein the first wireless telecommunications standard is the IEEE 802.16 standard.

11. The telephony system of claim 1, wherein the first wireless telecommunications standard is the IEEE 802.20 standard.

12. The telephony system of claim 1, wherein the first wireless telecommunications standard provides high-bandwidth communication over relatively long distances and wherein the second wireless telecommunications standard is one of BLUETOOTH®, 802.11b, and 802.11g.

13. The telephony system of claim 1, wherein the registration system provides additional content selected from the group consisting of video, music, and messaging.

14. The telephony system of claim 1, wherein the registration system provides additional functions including at least one of conferencing and call waiting.

15. The telephony system of claim 1, wherein the controller uses a selected unique hardware identification and a destination telephone number to determine an appropriate rule to apply to an incoming call, wherein different destination telephone numbers have different applicable rules.

16. The telephony system of claim 15, wherein the applicable rules comprise a plurality of forwarding an incoming call to a different telephone number if unanswered, forwarding an incoming call to an answering machine if unanswered, and forwarding an incoming call to an answering machine when received between certain hours.

17. The telephony system of claim 1, wherein the controller uses a selected unique hardware identification to determine a plurality of telephone numbers corresponding to a user of the respective registered handset, whereby an incoming call to any of the plurality of telephone numbers is forwarded to the registered handset.

18. The telephony system of claim 17, wherein the plurality of telephone numbers comprise a plurality of handset telephone number, office telephone number, and home telephone number.

19. The telephony system of claim 1, wherein the users of the handsets in the pre-registered group are family members.

20. The telephony system of claim 1, wherein the controller sends an incoming call to a telephone number corresponding to a selected registered handset to the selected registered handset only and not to other concurrently registered handsets.

21. A method comprising:
providing a registration station in communication with a cellular base station, the registration station comprising:
a base station transceiver operable to communicate with the base station using a first telecommunications standard;
a handset transceiver operable to communicate with handsets in communication range of the registration station; and
a controller operable to register automatically handsets in communication range of the registration station using a different second wireless telecommunications standard, wherein, through registration, the controller receives a unique hardware identification from each registered handset;
using, by the controller, a selected unique hardware identification to determine a set of user preferences for the respective registered handset, the user preferences comprising forwarding an incoming call to a different telephone number if unanswered, forwarding an incoming call to an answering machine if unanswered, and forwarding an incoming call to an answering machine when received between certain hours; and
forming, by the controller, a pre-registered group when there are multiple registered handsets having different telephone numbers within range of the registration station, whereby an incoming call to a given telephone number is directed to all of the handsets in the pre-registered group.

22. The telephony system of claim 21, wherein the user preferences comprise forwarding an incoming call to a different telephone number if unanswered.

23. The telephony system of claim 21, wherein the user preferences comprise forwarding an incoming call to an answering machine if unanswered.

24. The telephony system of claim 21, wherein the user preferences comprise forwarding an incoming call to an answering machine when received between certain hours.

25. The telephony system of claim 21, wherein a plurality of additional base stations are interconnected with each other and the base station to cover a wide geographic area, wherein the handset is able to communicate with the base station directly when not in communication range of the registration station, and wherein the handset transceiver is a cell phone so that a user can dial and receive calls using a cellular network or the telephony system.

26. The telephony system of claim 21, wherein the registration station is connected to the base station by a fixed line connection and wherein the first telecommunications standard operates at a frequency higher than those frequencies used by cellular radiofrequency telephones.

27. The telephony system of claim 21, wherein the registration station is connected to the base station by a wireless connection and wherein the first telecommunications standard operates at a frequency higher than those frequencies used by cellular radio frequency telephones.

28. The telephony system of claim 21, wherein the first telecommunications standard operates at a frequency higher than 3 GHz.

29. The telephony system of claim 21, wherein the first telecommunications standard operates at a frequency higher than 10 GHz.

30. The telephony system of claim 21, wherein the first wireless telecommunications standard is the IEEE 802.16 standard.

31. The telephony system of claim 21, wherein the first wireless telecommunications standard is the IEEE 802.20 standard.

32. The telephony system of claim 21, wherein the first wireless telecommunications standard provides high-bandwidth communication over relatively long distances and wherein the second wireless telecommunications standard is one of BLUETOOTH®, 802.11b, and 802.11g.

33. The telephony system of claim 21, wherein the registration system provides additional content selected from the group consisting of video, music, and messaging.

34. The telephony system of claim 21, wherein the registration system provides additional functions including at least one of conferencing and call waiting.

35. The telephony system of claim 21, further comprising: using, by the controller, a selected unique hardware identification and a destination telephone number to determine an appropriate rule to apply to an incoming call, wherein different destination telephone numbers have different applicable rules.

36. The telephony system of claim 35, wherein the applicable rules comprise a plurality of forwarding an incoming call to a different telephone number if unanswered, forwarding an incoming call to an answering machine if unanswered, and forwarding an incoming call to an answering machine when received between certain hours.

37. The telephony system of claim 21, further comprising: using, by the controller, a selected unique hardware identification to determine a plurality of telephone numbers corresponding to a user of the respective registered handset, whereby an incoming call to any of the plurality of telephone numbers is forwarded to the registered handset.

38. The telephony system of claim 37, wherein the plurality of telephone numbers comprise a plurality of handset telephone number, office telephone number, and home telephone number.

39. The telephony system of claim 21, wherein the users of the handsets in the pre-registered group are family members.

40. The telephony system of claim 21, further comprising: sending, by the controller, an incoming call to a telephone number corresponding to a selected registered handset to the selected registered handset only and not to other concurrently registered handsets.

41. In a registration station in communication with a cellular base station, the registration station comprising a base station transceiver operable to communicate with the base station using a first telecommunications standard; a handset transceiver operable to communicate with handsets in communication range of the registration station; and a controller operable to register automatically handsets in communication range of the registration station using a different second wireless telecommunications standard, wherein, through registration, the controller receives a unique hardware identification from each registered handset, a non-transient, non-volatile storage medium comprising processor-executable registration software operable to perform the following steps:

using, by the controller, a selected unique hardware identification to determine a set of user preferences for the respective registered handset, the user preferences comprising forwarding an incoming call to a different telephone number if unanswered, forwarding an incoming call to an answering machine if unanswered, and forwarding an incoming call to an answering machine when received between certain hours; and forming, by the controller, a pre-registered group when there are multiple registered handsets having different telephone numbers within range of the registration station, whereby an incoming call to a given telephone number is directed to all of the handsets in the pre-registered group.

42. The storage medium of claim 41, wherein the processor-executable registration software is operable to perform the step of using, by the controller, a selected unique hardware identification and a destination telephone number to determine an appropriate rule to apply to an incoming call, wherein different destination telephone numbers have different applicable rules.

43. The storage medium of claim 42, wherein the applicable rules comprise a plurality of forwarding an incoming call to a different telephone number if unanswered, forwarding an incoming call to an answering machine if unanswered, and forwarding an incoming call to an answering machine when received between certain hours.

44. The storage medium of claim 41, wherein the processor-executable registration software is operable to perform the step of using, by the controller, a selected unique hardware identification to determine a plurality of telephone numbers corresponding to a user of the respective registered handset, whereby an incoming call to any of the plurality of telephone numbers is forwarded to the registered handset.

45. The storage medium of claim 44, wherein the plurality of telephone numbers comprise a plurality of handset telephone number, office telephone number, and home telephone number.

46. The storage medium of claim 41, wherein the processor-executable registration software is operable to perform the step of sending, by the controller, an incoming call to a telephone number corresponding to a selected registered handset to the selected registered handset only and not to other concurrently registered handsets.

47. The storage medium of claim 41, wherein the user preferences comprise forwarding an incoming call to a different telephone number if unanswered.

48. The storage medium of claim 41, wherein the user preferences comprise forwarding an incoming call to an answering machine if unanswered.

49. The storage medium of claim 41, wherein the user preferences comprise forwarding an incoming call to an answering machine when received between certain hours.

50. The storage medium of claim 41, wherein the users of the handsets in the pre-registered group are family members.

* * * * *